US012744324B2

(12) United States Patent
Sum et al.

(10) Patent No.: US 12,744,324 B2
(45) Date of Patent: Sep. 22, 2026

(54) TWO PART WAVEGUIDE COUPLING DEVICE

(71) Applicant: VEGA Grieshaber KG, Wolfach (DE)

(72) Inventors: Christian Sum, Wolfach (DE); Christoph Mueller, Oppenau (DE)

(73) Assignee: VEGA Grieshaber KG, Wolfach (DE)

( * ) Notice: Subject to any disclaimer, the term of this patent is extended or adjusted under 35 U.S.C. 154(b) by 399 days.

(21) Appl. No.: 18/546,123

(22) PCT Filed: Feb. 15, 2022

(86) PCT No.: PCT/EP2022/053670
§ 371 (c)(1),
(2) Date: Aug. 11, 2023

(87) PCT Pub. No.: WO2022/171900
PCT Pub. Date: Aug. 18, 2022

(65) Prior Publication Data

US 2024/0136724 A1 Apr. 25, 2024
US 2024/0235039 A9 Jul. 11, 2024

(30) Foreign Application Priority Data

Feb. 15, 2021 (DE) ..................... 10 2021 201 394.5

(51) Int. Cl.
*H01Q 13/06* (2006.01)
*H01Q 1/22* (2006.01)

(52) U.S. Cl.
CPC ............. *H01Q 13/06* (2013.01); *H01Q 1/225* (2013.01)

(58) Field of Classification Search
CPC ............................... H01Q 13/06; H01Q 1/225
See application file for complete search history.

(56) References Cited

U.S. PATENT DOCUMENTS

| | | | |
|---|---|---|---|
| 5,359,339 A | 10/1994 | Agrawal et al. | |
| 5,825,333 A | 10/1998 | Kudoh et al. | |
| 2002/0097109 A1* | 7/2002 | du Toit .................. | H01P 5/107 333/26 |
| 2004/0080324 A1 | 4/2004 | Westerling et al. | |

(Continued)

FOREIGN PATENT DOCUMENTS

| | | |
|---|---|---|
| CN | 1195908 A | 10/1998 |
| CN | 104428943 A | 3/2015 |

(Continued)

OTHER PUBLICATIONS

International Preliminary Report on Patentability and Written Opinion issued Aug. 24, 2023, in PCT/EP2022/053670, 9 pages.

(Continued)

*Primary Examiner* — Nazra Nur Waheed
(74) *Attorney, Agent, or Firm* — Oblon, McClelland, Maier & Neustadt, L.L.P.

(57) ABSTRACT

A waveguide coupling device for a radar sensor is provided, including: a waveguide configured to emit a radar signal via a radiating end of the waveguide; and a fin part with at least one excitation fin, via which a radio frequency (RF) signal can be coupled into the waveguide for generating the radar signal, the waveguide and the fin part being formed in two parts, and the fin part being mechanically coupled to an excitation end of the waveguide opposite the radiating end of the waveguide.

19 Claims, 3 Drawing Sheets

(56) References Cited

U.S. PATENT DOCUMENTS

| | | | | |
|---|---|---|---|---|
| 2006/0012512 | A1 | 1/2006 | Jirskog | |
| 2014/0007674 | A1 * | 1/2014 | Weinzierle | H01P 5/024 333/24 R |
| 2019/0063983 | A1 * | 2/2019 | Schultheiss | G01S 7/03 |
| 2020/0059000 | A1 | 2/2020 | Kamo et al. | |
| 2020/0136267 | A1 | 4/2020 | Choon et al. | |
| 2022/0238978 | A1 * | 7/2022 | Goebel | G01S 7/03 |

FOREIGN PATENT DOCUMENTS

| | | | | |
|---|---|---|---|---|
| DE | 10 2005 054 233 | A1 | 5/2007 | |
| DE | 10 2013 108 434 | A1 | 2/2015 | |
| DE | 10 2019 204 671 | A1 | 10/2020 | |
| EP | 3 955 376 | A1 | 2/2022 | |
| FR | 2 519 476 | A1 | 7/1983 | |
| WO | WO-2017167916 | A1 * | 10/2017 | H01P 5/107 |

OTHER PUBLICATIONS

International Search Report and Written Opinion issued May 24, 2022, in PCT/EP2022/053670 (with English Translation of Category of Cited Documents), 16 pages.

Office Action issued Oct. 15, 2021, in corresponding Germany Patent Application No. 10 2021 201 394.5, 7 pages.

International Search Report issued May 24, 2022 in PCT/EP2022/053670, filed on Feb. 15, 2022, 2 pages.

Office Action dated Apr. 22, 2026 issued in corresponding Chinese patent application No. 202280014924.X.

* cited by examiner

TWO PART WAVEGUIDE COUPLING DEVICE

FIELD OF INVENTION

The invention relates generally to the field of radar technology and/or radar measurement technology. In particular, the invention relates to a waveguide coupling device for a radar sensor, a radar sensor comprising such a waveguide coupling device, and the use of such a waveguide coupling device.

BACKGROUND

Radar measuring devices or radar sensors can be used, among other things, in automation technology in the industrial environment. For example, they can be designed in the form of distance sensors for determining a distance to an object and/or in the form of radar level meters for determining a level of a medium. Often, such radar level meters (hereinafter also referred to as level meters) have an antenna, such as a horn antenna, which can be fed with a radar signal via a waveguide and via which the radar signal can be emitted and a part of the radar signal reflected on a surface can be received.

A radar signal or an electromagnetic wave underlying the radar signal, such as a microwave, can be generated by a radar module with a radar signal source and coupled into the waveguide via a substrate-integrated waveguide, for example, from which the radar signal can be radiated. An injection from the substrate-integrated waveguide into the waveguide can be made, for example, via an exciter pin with a resonance pot or via a lambda/4 plate with a resonance pot. However, such waveguide couplings (or waveguide coupling devices) can be cost-intensive to manufacture, for example because the resonance pot is regularly incorporated in a printed circuit board or must be mounted as precisely as possible on the rear side of the printed circuit board as a further individual mechanical part.

Overall, high quality requirements may be placed on waveguide coupling devices, for example with regard to precise manufacturing, surface quality and/or material quality. This can also lead to complex and cost-intensive production of waveguide coupling devices.

SUMMARY

Embodiments of the present invention may advantageously provide an improved waveguide coupling device (hereinafter also referred to as "waveguide coupling") for a radar sensor, and a corresponding radar sensor.

This is achieved in particular by the subject matter of the independent patent claims. Further embodiments of the invention are included in the dependent claims and the following description.

The following description applies equally to the waveguide coupling device, the radar sensor and the use of the waveguide coupling device. In other words, features, elements and/or functions described below with reference to the waveguide coupling device apply equally to the radar sensor as well as the use of the waveguide coupling device and vice versa.

A first aspect of the present disclosure relates to a waveguide coupling device for a radar sensor, a radar measurement device, and/or a radar apparatus. The waveguide coupling device comprises a waveguide for emitting a radar signal via a radiating end of the waveguide. In addition, the waveguide coupling device has a fin part having at least one excitation fin via which a radio frequency signal (hereinafter "RF signal") for generating, forming, and/or producing the radar signal can be coupled into the waveguide. The waveguide and the fin part are formed in two parts, wherein the fin part is mechanically coupled to an excitation end of the waveguide opposite the radiating end of the waveguide and/or is arranged at the excitation end of the waveguide. The fin part may serve as an exciter and/or excitation element for generating and/or exciting the radar signal. For example, the fin part may be mechanically coupled to an end (or excitation end) of the waveguide opposite the radiating end of the waveguide as an exciter and/or arranged at this end of the waveguide.

The waveguide can basically have any geometry and/or cross-sectional geometry. For example, the waveguide can be designed as a round waveguide, an elliptical waveguide, an oval waveguide or a rectangular waveguide. A longitudinal extension direction of the waveguide may be substantially parallel to a radiation direction and/or a propagation direction (or running direction) of the radar signal inside the waveguide. The waveguide can be used, for example, to couple and radiate the radar signal into an antenna, such as of a radar sensor and/or a level meter. The waveguide can, for example, be made at least partially of metal and/or an electrically conductive material.

It should be noted that analogous to transmitting and/or radiating the radar signal, a radar signal reflected from a surface can also be received with the waveguide coupling device. All of the foregoing and subsequent disclosures relating to radiating and/or transmitting the radar signal therefore apply analogously to receiving a radar signal with the waveguide coupling device.

In the context of the present disclosure, the fin part may also be referred to as an exciter structure, a fin component, an exciter component, and/or an exciter part. The fin component and at least a portion of the waveguide, such as the excitation end, may be geometrically matched to each other such that the RF signal may be coupled into an interior volume of the waveguide via the fin component and the radar signal may be formed via the at least one excitation fin, such as based on excitation of one or more resonant waves.

The fin part and the excitation fin can be one-piece and/or one-piece. The fin part together with the excitation fin can, for example, be manufactured or produced in a single casting, die casting, injection molding and/or 3D printing process in metal and/or in plastic with subsequent metallization. Both components, the fin part and the waveguide, can also be machined metal parts.

In the context of the present disclosure, an "excitation fin" may refer to a geometric structure formed such that one or more resonant waves can be formed and/or generated in an inner volume of the fin part. This can be done due to the resonant structures of the excitation fin for the desired frequencies of the radar signal (so-called exciter frequencies). A high-frequency signal, RF signal, can be coupled into the waveguide via the excitation fin to form the radar signal.

The RF signal (also referred to as high-frequency signal) can designate an electromagnetic wave in the high-frequency range. For example, the RF signal may have a frequency greater than 30 GHz, in particular greater than 50 GHz, for example greater than 70 GHz, and further for example greater than 80 GHz. The RF signal may, for example, have a frequency in a range around 160 GHz and/or around 240 GHz, in particular up to 300 GHz.

In principle, the excitation fin can have any geometry, shape, size, cross-sectional geometry or the like. For example, the excitation fin can be plate-shaped, pin-shaped, fin-like, and/or cuboid-shaped at least in a partial area. Other geometries are also conceivable. For example, the excitation fin may project at least partially from a wall and/or inner surface of the fin part at least partially into the inner volume of the waveguide and/or the fin part.

The invention may thus be regarded as based, inter alia, on the findings described below. An exciter structure of a waveguide coupling, such as the fin part and/or the at least one excitation fin, are to be formed as precisely and exactly as possible, in particular in high-frequency technology, for example in order to be able to fulfill a specification or requirement for a frequency (or average frequency) of the RF signal and/or of the radar signal as well as for a bandwidth of the radar signal. Depending on the frequency(s), frequency range and/or bandwidth of the radar signal to be generated, the fin part and/or the excitation fin may be a filigree structure. Such filigree structures can often only be manufactured with the required accuracy and precision in terms of geometry, material quality and surface quality of the waveguide coupling at great expense, particularly in the case of a one-piece design of the waveguide and the fin part.

According to the invention, the waveguide and the fin part are therefore designed in two parts. This can allow the fin part, the waveguide and/or the waveguide coupling device to be manufactured with high precision and accuracy. It can also reduce rejects of waveguide coupling devices in manufacturing. Overall, this may allow cost-effective and precise manufacturing of the waveguide coupling device. This may in turn allow to provide an improved waveguide coupling device in terms of frequency, frequency spectrum and/or bandwidth of the radar signal. In other words, the two-part design of the waveguide and the fin part can achieve a required accuracy of the radiated radar signal with respect to frequency, frequency spectrum, bandwidth and/or frequency range.

The fin part and the waveguide may be manufactured in separate manufacturing processes or steps and then assembled or coupled together. For example, the fin part may first be mounted to a target substrate, such as a printed circuit board, e.g., by soldering, bonding, and/or pressing, and the waveguide may then be coupled to the fin part. Alternatively, the fin part can first be coupled to the waveguide and the waveguide together with the fin part can subsequently be further processed, for example by soldering, gluing, pressing, screwing and/or riveting, for example mounted on, contacted to or connected to the target substrate. The target substrate can basically be any substrate that can be provided to receive and/or support the waveguide and/or the fin part. In other words, the waveguide and the fin part may be attached to a target pad. The target substrate may be, for example, a printed circuit board, a printed circuit board, a high-frequency board, a plate or the like.

The waveguide coupling device according to the invention can thus be manufactured in an advantageous manner in an accurate, precise and reproducible manner, which can, among other things, improve a characteristic of the waveguide coupling device. Also, an improved waveguide coupling device for generating a broadband radar signal can thus be enabled. In particular, accurate and precise fabrication of the fin part can be achieved with the two-part design of the waveguide coupling device such that a desired or predetermined high frequency performance or characteristic, e.g., in terms of frequency, average frequency, frequency spectrum, and/or frequency bandwidth of the radar signal, can be achieved.

According to an embodiment, the fin part and the waveguide are positively and/or non-positively coupled to each other. In order to achieve a desired high frequency performance and/or characteristic of the radar signal, it may be advantageous to avoid undesired resonances in the waveguide and/or the fin part. Undesirable resonances may be caused, for example, by roughness, bumps or interfering structures. Therefore, it may be advantageous to couple the fin part to the waveguide as precisely and immovably as possible. This can be made possible by positive and/or non-positive coupling between the fin part and the waveguide.

According to an embodiment, the fin part and the waveguide are coupled to each other in a torsion-proof manner. Alternatively or additionally, the fin part and the waveguide are arranged concentrically to each other. In other words, the fin part and the waveguide can be coupled to each other in such a way that they cannot be rotated against each other or relative to each other, for example in the circumferential direction of the waveguide. By coupling the fin part to the waveguide in a non-rotatable manner, a predetermined, predefined and/or desired orientation of the excitation fin relative to the waveguide can be achieved.

According to an embodiment, a receptacle is formed at the excitation end of the waveguide. In addition, the fin part has a receiving portion that is at least partially received in the receiving portion of the waveguide so that the fin part and the waveguide are coupled together. The receiving portion of the waveguide may be, for example, a recess, a trough, a fillet, or the like. The receiving portion of the waveguide may be geometrically matched to the receiving portion of the fin part, or vice versa.

It should be noted at this point that, alternatively, the fin part can also have a receptacle and the waveguide can have a receiving portion at its excitation end. All of the following descriptions regarding the accommodation of the waveguide and the accommodation area of the fin part therefore apply equally to the case where the waveguide has an accommodation area and the fin part has an accommodation.

According to an embodiment, the waveguide receptacle has a receiving contour. In addition, the receiving portion of the fin part has an outer contour which is designed to correspond to the receiving contour of the receiving portion of the waveguide in such a way that the fin part is positively coupled to the waveguide. The term “corresponding” is to be understood broadly in the context of the present disclosure. It may be understood to mean that the receiving contour of the receiving portion of the waveguide geometrically corresponds to the outer contour of the receiving portion of the fin part, such that when the fin part is coupled to the waveguide, the receiving contour and the outer contour can be substantially flat against each other and/or at least partially positively interlocked. This can also be understood to mean that the outer contour of the receiving portion of the fin part is formed as a negative 2D or 3D image of the receiving contour of the receiving portion of the waveguide, or vice versa.

According to an embodiment, the receiving contour of the receiving portion of the waveguide and the outer contour of the receiving portion of the fin part have positioning structures corresponding to each other, so that the fin part and/or the excitation fin is coupled to the waveguide in a predetermined relative position to the waveguide, in particular in a single predetermined relative position to the waveguide.

This may enable precise coupling between the waveguide and the fin part in the predetermined relative position.

Various elements or structures can serve as positioning structures. For example, at least one peg element can be provided on the waveguide or the fin part, which can engage in a corresponding notch or recess of the respective other component. Alternatively or additionally, the outer contour of the receiving portion and/or the receiving contour of the waveguide can be rotationally asymmetrical about a longitudinal axis of the waveguide and/or the fin part. Other positioning structures are also conceivable.

According to an embodiment, at least one pressing rib is formed on the receiving portion of the waveguide and/or on the receiving portion of the fin part for pressing the fin part to the waveguide and/or for relative positioning of the fin part and the waveguide. Thus, for example, the fin part can be pressed or pushed into the waveguide or at least partially into the waveguide so that the fin part can be attached to the waveguide in a mechanically stable manner. Any number of pressing ribs may be arranged on the receiving portion of the fin part. It is also conceivable that the at least one grouting rib is arranged on the receiving portion of the waveguide. It is also conceivable that at least one crimping rib is arranged on the receptacle of the waveguide and at least one crimping rib is arranged on the receptacle region of the fin part. In this case, the crimping ribs of the respective components can optionally be offset from one another in the circumferential direction. Alternatively or additionally, other connecting elements can also be provided for coupling the fin part to the waveguide, such as pins or clamp connections.

According to an embodiment, the hollow conductor receptacle and the fin part receiving portion are pressed together at least selectively, regionally or completely along an outer circumference of the receiving portion. It is conceivable, for example, that the receiving portion of the fin part is pressed in the receiving portion of the waveguide (or vice versa). Different pressing or connecting mechanisms can be arranged in each case on the receiving portion of the waveguide and/or on the receiving portion of the fin part at points, in areas or continuously in the circumferential direction. Also, the receiving portion of the fin part can have a ring seal, which can be configured to prevent possible vibration movements between the waveguide and the fin part.

According to an embodiment, the receiving portion of the fin part is arranged in the receiving portion of the waveguide in such a way that a parting plane, parting surface, intersection surface and/or interface between the fin part and the waveguide is offset and/or spaced apart from the at least one excitation fin in the axial direction of the waveguide. In this way, interference points, undesired resonances and/or an emergence of resonant waves with an undesired resonant frequency inside the waveguide can be avoided in an advantageous manner. The resonant structures of the excitation fin in the fin part can thereby be influenced, for example, to a small extent or not by directly adjacent, neighboring and/or surrounding (possibly arising) gaps, gaps and/or butt joints at the separation point.

The excitation fin can generally generate at least one resonant wave with a resonant frequency, such as with a predetermined or desired resonant frequency, wherein the resonant wave can form and/or generate the radar signal at least partially as it progresses in an interior volume of the waveguide toward the radiating end. Interference points in the interior of the waveguide can lead to undesired resonances and/or resonance waves, which can overlap with the at least one (desired) resonance wave and thus influence a frequency, an average frequency, a frequency spectrum and/or a bandwidth of the radar signal. By spacing the separation plane, separation surface, intersection surface and/or interface between the fin part and the waveguide in the axial direction of the waveguide away from the at least one excitation fin, such unwanted resonances can be effectively avoided.

According to an embodiment, the separation plane, separation surface, intersection surface, and/or interface between the fin part and the waveguide is arranged closer to the radiating end of the waveguide in the axial direction of the waveguide than the at least one excitation fin.

According to an embodiment, the at least one excitation fin is at least partially arranged in an inner volume of the waveguide.

According to an embodiment, the at least one excitation fin can be excited by the RF signal in such a way that one or more resonance waves can be generated in an inner volume of the waveguide and/or the fin part to form the radar signal. A resonance wave can be generated by the excitation fin, at the excitation fin and/or between the excitation fin and a further excitation fin or a further geometric structure. The at least one resonant wave can designate an electromagnetic wave which was generated by an excitation fin and which has a defined resonant frequency. The excitation fin can also be referred to as an excitation element or fin.

According to an embodiment, the fin part has at least two excitation fins which can be excited by the RF signal to form at least two resonant waves with mutually different resonant frequencies, wherein the radar signal can be generated based on a superposition and/or superposition of the at least two resonant waves in an inner volume of the waveguide. In order to form at least two resonant waves with mutually different resonant frequencies, the two excitation fins may be differently shaped and/or arranged. For example, the two excitation fins may have different lengths dimensioned in the longitudinal direction of the fin part and/or thicknesses dimensioned transversely to the longitudinal direction or in the radial direction of the waveguide. By forming at least two resonant waves and superimposing them on the radar signal, a bandwidth of the radar signal can be increased in an advantageous manner.

The RF signal can have a certain bandwidth, for example, so that multiple frequencies can be applied to the excitation fins. Multiple resonances, for example for different and/or adjacent frequencies, can create a geometry or resonance geometry that can radiate frequencies with a higher bandwidth very well. Different frequencies of the radar signal can thereby be radiated from the excitation fins into the waveguide by resonance of the excitation fins excited with the RF signal. The more resonant structures there are, for example for different and/or adjacent frequencies, the broader-band the overall geometry and/or the radar signal can become. Individual resonators can be arranged in such a way that they do not eliminate each other or at least hardly influence each other negatively.

If the excitation frequency, or resonant frequency, matches the resonant structure exactly, or if the structure is exactly resonant to the resonant frequency, then optimum radiation characteristics can be achieved.

For example, a first length of a first excitation fin and a second length of a second excitation fin may be selected and/or matched in relation to each other such that the first resonant wave may be generated at the first resonant frequency and the second resonant wave may be generated at the second resonant frequency. The first and second resonant waves can, for example, interfere in the waveguide and/or in the fin part and at least partially form the radar signal.

Further, the first excitation fin and the second excitation fin may protrude from a wall and/or inner surface of the fin part at two opposing sides and/or at two different sides of the fin part, for example toward a center of the waveguide and/or the fin part. For example, the first and second excitation fins, and optionally one or more further excitation fins or other structures of the fin part, may project from the wall and/or inner surface of the fin part along an inner circumference of the fin part at different positions, regions and/or sides of the waveguide.

According to an embodiment, the waveguide coupling device further comprises at least one printed circuit board on which the fin part and/or the waveguide are arranged and/or fixed. The printed circuit board may be, for example, a radio frequency substrate, a printed circuit board, or a printed circuit board (PCB). The PCB may further comprise, for example, a waveguide, such as a substrate integrated waveguide (SIW), via which the RF signal can be coupled to the fin part.

According to an embodiment, the fin part and/or the waveguide are attached to the printed circuit board by means of an axially acting screw connection, by means of bonding, by means of soldering, by means of welding and/or by means of pressing. It is conceivable that only the waveguide is fastened to the printed circuit board, whereby the fin part can be coupled to the waveguide and arranged in the axial direction between the waveguide and the printed circuit board. Alternatively or additionally, the fin part may be connected to the printed circuit board, wherein the waveguide may be attached or coupled to the fin part only or may be connected to the printed circuit board as well.

According to an embodiment, a high-frequency chip and/or a high-frequency circuit for generating the RF signal is arranged between the printed circuit board and the fin part. For this purpose, it can be provided, for example, that the waveguide has a depression which can be configured to accommodate the high-frequency chip and/or the high-frequency circuit between the printed circuit board and the fin part. The high-frequency chip and/or the high-frequency circuit may generate the RF signal and/or be arranged such that the RF signal can be advantageously coupled into the fin part. The high frequency chip may be fixedly connected to the printed circuit board.

The RF signal from the high-frequency chip can alternatively or additionally be transferred to a conductor track on the printed circuit board (e.g. by wire bonding, soldering and the like), which can then feed a waveguide coupling device that is, for example, somewhat remote from the chip.

According to an embodiment, at least one excitation element is arranged between the printed circuit board and the fin part for coupling and/or transmitting the RF signal to the at least one excitation fin of the fin part. The excitation element may generally be a structure which may be arranged, inter alia, for coupling the RF signal out of the printed circuit board into the fin part. The excitation element may, for example, be in the form of an excitation pin which may be at least partially in contact with the at least one excitation fin in order to couple the RF signal from the RF chip and/or the printed circuit board onto the fin part and/or into the waveguide.

Optionally, a resonance pot, for example to increase the bandwidth of the radar signal, may also be arranged on the printed circuit board, for example on a rear side of the printed circuit board. Alternatively or additionally, the resonance pot can be at least partially integrated in the printed circuit board According to an embodiment, the fin part and/or the waveguide has a surface protection to protect the surface from environmental influences. The surface protection can, for example, take the form of zinc plating, gold plating, coating, chromating and/or nickel plating of the fin part and/or the waveguide.

According to an embodiment, the radar signal has an average frequency greater than 50 GHz, in particular greater than 70 GHz. For example, a bandwidth of the radar signal may be about 10 GHz to 50 GHz, in particular about 20 GHz. For example, the radar signal may cover a frequency range of about 70 GHz to 90 GHz. However, the invention is by no means limited to such frequencies or frequency ranges. In particular, frequencies above 90 GHz, above 100 GHz or above are also possible.

Another aspect of the present disclosure relates to a radar sensor having a waveguide coupling device as described above and below. The radar sensor may be of any type. It may be a level radar sensor, a distance sensor, a boundary level sensor, a motion radar sensor, a weather radar sensor, or a ground radar sensor. For example, the radar sensor may have one or more antennas, such as a horn antenna. The radar sensor may further generally be a field device for sensing one or more measurement quantities or process measurement quantities, such as in the field of process automation or automation technology.

Sometimes it can be provided that radar sensors generate a transmit signal or radar signal which covers a certain frequency range. In level measurement technology, for example, the transmission frequency can be raised over a certain frequency range during a measurement cycle, which is also referred to as Frequency Modulated Continuous Wave Radar. By providing a broadband radar signal via the waveguide coupling device, such a frequency lift can be precisely implemented or enabled.

Another aspect of the present disclosure relates to the use of a waveguide coupling device as described above and below in a radar sensor and/or a level meter. Alternatively or additionally, the present disclosure relates to the use of a radar sensor and/or level meter with a waveguide coupling device as described above and below.

Exemplary embodiments are described below with reference to the figures. The illustrations in the figures are schematic and not to scale. If the same or similar reference signs are used in the following description of the figures, these designate the same or similar elements.

DETAILED DESCRIPTION OF EMBODIMENTS

Figure 1:
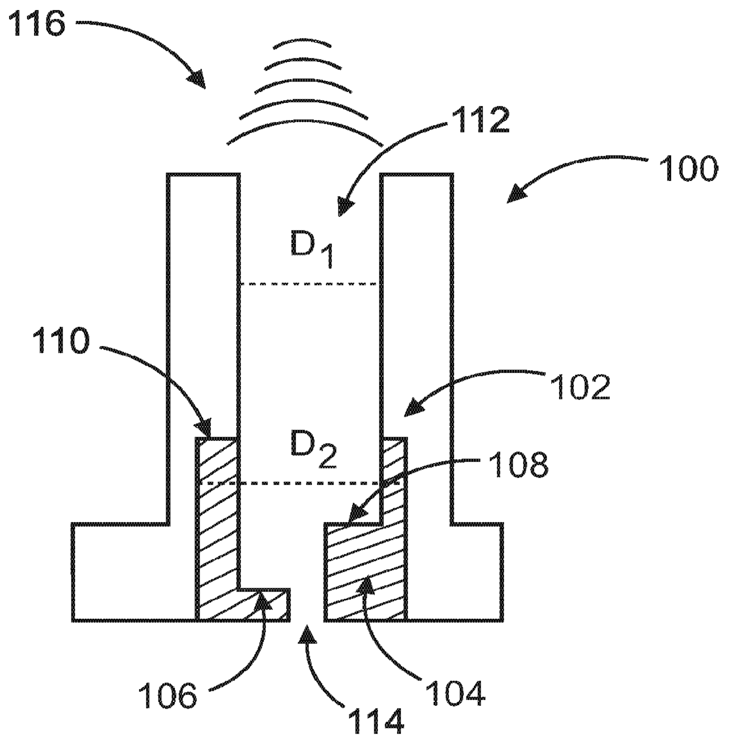
FIG. 1 shows a waveguide coupling device according to an embodiment.

FIG. 1 shows a waveguide coupling device 100 according to an embodiment.

The waveguide coupling device 100 includes a waveguide 102 and a fin part 104. The fin part 104 in turn includes at least one excitation fin 106, 108.

The waveguide 102 and the fin part 104 are configured as two separate components that can be mechanically coupled to each other. In this regard, the fin part 104 is disposed and/or coupled to an excitation end 114 of the waveguide 102, the excitation end 114 opposing a radiation end 112 of the waveguide via which a radar signal 116 may be radiated from the waveguide 102. Due to the two-part construction of the waveguide 102 and the fin part 104, it may be possible to ensure the required geometry, such as the required cylindricity in the case of a circular waveguide 102, and the required surface finish of the inner volume of the waveguide 102, such as a waveguide bore in the waveguide 102, in a separate step to the manufacturing of the fin part 104 by a suitable manufacturing process, such as drilling, milling, reaming, honing and/or grinding. As a result, both the fin component 104 and the waveguide 102 can be manufactured with increased precision, quality and grade. In addition, the manufacturing process can be simplified and made more cost effective.

The fin part 104 and the waveguide 102 may be positively coupled and/or frictionally coupled to each other. The waveguide 102 may have, for example, two different inner diameters D1, D2. For example, the first inner diameter D1 of the radiating end 112 of the waveguide may be smaller than the second inner diameter D2 of the exciting end of the waveguide. The fin part 104 may then be at least partially received within the internal volume of the waveguide 102 and/or at the excitation end 114, which may have a second internal diameter D2. For this purpose, the fin part 104 may preferably have an outer diameter corresponding to the second inner diameter D2 of the waveguide 102. For example, the outer diameter of the fin part 104 may be slightly oversized so that the fin part 104 and the waveguide 102 may be compressed together.

The fin part 104 of FIG. 1 has two excitation fins 106, 108 as an example. However, only one excitation fin or more than two excitation fins may be provided. A radio frequency signal is coupled into the waveguide 102 via at least one of the excitation fins 106, 108 to form the radar signal 116. In particular, at least one of the excitation fins 106, 108 may be excited by the RF signal, or by one or more frequencies of the RF signal, such that one or more resonant waves may be generated in an interior volume of the waveguide 102 and/or the fin part 104. These one or more resonant waves may superimpose to form, at least in part, the radar signal 116. For example, the excitation fins 106, 108 may be at least partially disposed within an interior volume of the waveguide 102 . . . . Further resonant waves with further resonant frequencies may also be generated, for example between the excitation fins 106, 108 and a further structure of the waveguide coupling 100 and/or a wall of the waveguide 102.

The high frequency signal may be coupled into the fin part 104, for example via an excitation element, whereby at least two resonant waves of different resonant frequencies may be generated based on the excitation fins 106, 108. For example, a first resonant wave may be formed at one of the excitation elements 106, 108 and a second resonant wave may be formed between the two excitation elements 106, 108, for example between their top edges. Alternatively or additionally, one of the resonant waves may be formed at one of the excitation fins 106, 108. In particular, the lengths of the two excitation fins 106, 108 may differ from each other and/or be coordinated such that the resonant waves may overlap. For example, the resonant waves may add up at least partially in phase and/or with substantially identical phase (and/or some phase offset from each other) as the wave(s) progress through the waveguide 102 to form at least a portion of the radar signal 116. Thus, a desirable broadband nature of the radar signal 116 can be achieved. For example, the broadband nature of the signal 116 may be in a range of 1-50 GHz, particularly around 10 GHz at a frequency of 80 GHz. With this type of coupling, bandwidths of more than 10%, for example 12-15%, about 12-13%, can be achieved.

Further, a separation plane, separation surface, intersection surface, and/or interface 110 between the fin part 104 and the waveguide 102 in the axial direction of the waveguide 102, which may be parallel to a radiating direction of the waveguide 102, is offset and/or spaced from the excitation fin 108. For example, this interface 110 is arranged closer to the radiating end 112 of the waveguide in the axial direction of the waveguide 102 than the at least one excitation fin 108. In addition, the fin part 104 may have an inner diameter D1 at the height of the interface 110 that substantially corresponds to the first inner diameter of the waveguide 104.

To protect the surface of the waveguide 102 and/or the fin part 104 from environmental influences, such as corrosion, the waveguide 102 and/or the fin part 104 may have a surface protection and/or coating. For example, the surface protection may be implemented with an electroplated coating, such as zinc plating, chromate plating, or nickel plating. The realization of the galvanic coating, or surface protection, may be performed prior to coupling the fin part 104 to the waveguide 102. In this way, possible minimal joining gaps can be closed and additional bonding of the two components, i.e. the fin part 104 and the waveguide 102, can be achieved.

The realization of the galvanic coating, or surface protection, can be done before the coupling of the fin part 104 with the waveguide 102, or only after the coupling, assembly, and/or joining of the two parts. In this case, possible minimal joining gaps can be closed and additional bonding of the two components, i.e., the fin part 104 and the waveguide 102, can be achieved.

Figure 2A:
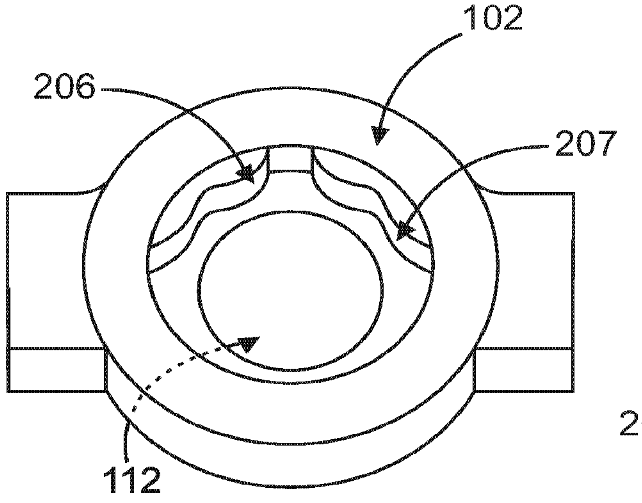
FIGS. 2*a* and 2*b* show a waveguide coupling device according to an embodiment.
Figure 2B:
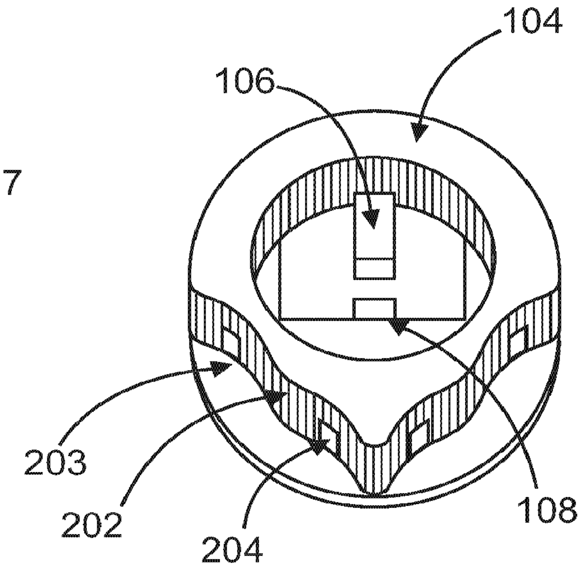

FIGS. 2*a* and 2*b* show a waveguide coupling device 100. In particular, FIG. 2*a* shows a perspective view of the waveguide 102 and FIG. 2*b* shows a perspective view of the fin part 104. Unless otherwise described, the waveguide coupling device 100 of FIGS. 2*a* and 2*b* has the same elements and/or components as the waveguide coupling device of FIG. 1.

The waveguide 102 of FIG. 2*a* includes a receptacle 206 formed on the excitation end 114 of the waveguide 102. In turn, the fin part 104 of FIG. 2*b* includes a receiving portion 202 that is configured to be positively coupled, received, pressed, and/or mounted within the receiving portion 206 of the waveguide 102. The receptacle 206 of the waveguide 102 of FIG. 2*a* extends at least partially into the interior volume of the waveguide 102, such that the receiving region 202 of the fin part 104 may be at least partially received therein. The receiving region 202 of the fin part 104 is in the form of a projection, in contrast to the receiving region 206 of the waveguide 102. Alternatively, a receptacle may be formed on the fin part for at least partially receiving a receiving region of the waveguide 102.

The receiving portion 206 of the waveguide 102 further includes a receiving contour 207, which may be formed and/or disposed internally of the receiving portion 206. The receiving portion 202 of the fin part 104 further comprises an outer contour 203, which is formed to correspond to the receiving contour 207 of the receiving portion 206 of the waveguide 102. The waveguide 102 and the fin part 104 can be positively coupled to each other via the receiving contour 207 and the outer contour 203 of the respective components. Moreover, the receiving contour 206 of the waveguide 102 and the receiving contour 202 of the fin part 102 are formed such that the fin part 104 cannot rotate relative to the waveguide 102. In other words, the receiving contour 207 and the outer contour 203 are configured such that the fin part 104 can be coupled to the waveguide 102 only in a relative position to the waveguide predetermined by the receiving region 202 and the receiving 206 and/or can be coupled in a rotationally fixed manner. For this purpose, the receiving portion 206 and the receiving portion 202 are configured to be non-rotationally symmetrical. For example, the fin part 104 may be mounted in the predetermined, predetermined, or predefined position with the waveguide 104 by pressing the fin part 104 into the receptacle 206 of the waveguide 102.

Optionally, one or more grouting ribs 204 may be provided on the receiving portion 202 of the fin part 104 and/or on the receptacle 206 for this purpose. The receiving portion 202 may alternatively or additionally have a slightly larger diameter compared to the receiving portion 206, so that the receiving portion 206 of the waveguide 102 and the receiving portion 202 of the fin part 104 can be pressed together completely along the outer circumference of the receiving portion 202. By providing crimping ribs 204 evenly along the receiving portion 202 of the fin part 104, for example, on two opposing sides and/or at multiple positions along the circumference of the receiving portion 202, concentric positioning and crimping of the fin part 104 within the waveguide 102 may be enabled.

Figure 3:
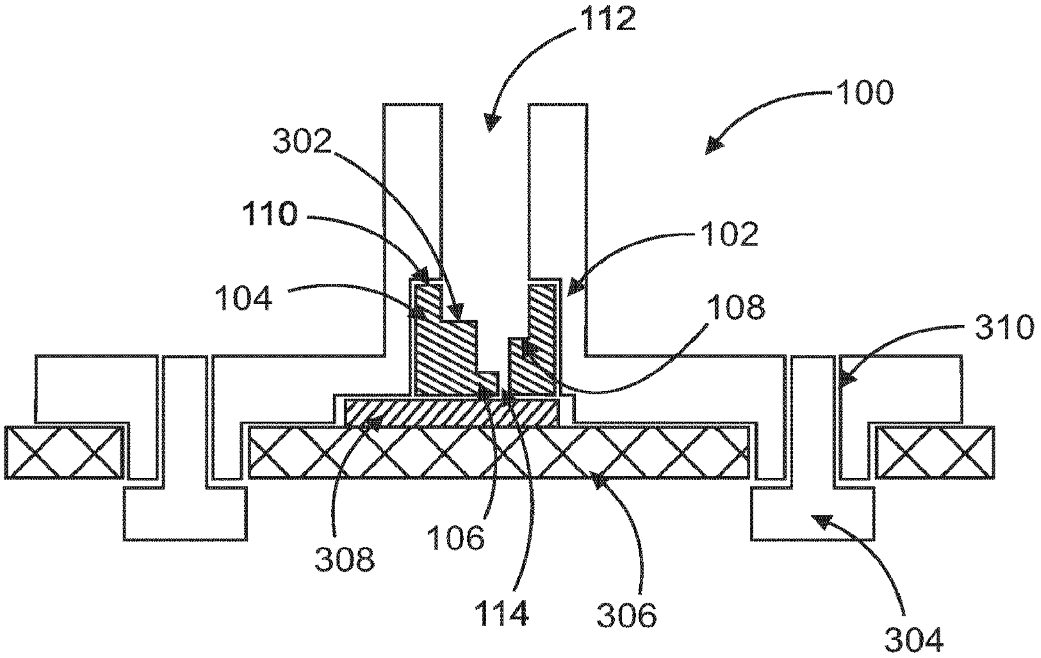
FIG. 3 shows a waveguide coupling device according to an embodiment.

FIG. 3 shows a waveguide coupling device 100 according to a further embodiment. Unless otherwise described, the waveguide coupling device 100 of FIG. 3 has the same elements and/or components as the waveguide coupling device of FIGS. 1, 2*a* and 2*b*.

The waveguide coupling device 100 of FIG. 3 further comprises a printed circuit board 306 to which the fin part 104 and the waveguide 102 are attached by means of a screw connection 304. For this purpose, the waveguide 102 may have, for example, threads 310, recesses 310, or holes 310 for the screw connection 304. Alternatively, the fin part 104 and the waveguide 102 may be attached to the printed circuit board 306 by means of an adhesive connection, a soldered connection, a welded connection and/or a crimped connection.

A high frequency chip 308 and/or a high frequency circuit 308 is disposed between the circuit board 306 and the fin part 104. The high frequency chip 308 is configured to generate the high frequency signal. The waveguide 102 of FIG. 3 includes a depression 402 (see FIG. 4*a*) configured to at least partially receive the high frequency chip 308. The high frequency signal may be coupled directly from the printed circuit board 306 into the waveguide 102 via the fin part 104, which may be very delicate and precisely fabricated. For example, an excitation element, such as in the form of an excitation pin may be disposed between the RF chip 308 and the fin part. In particular, the exciter pin may thereby be arranged parallel to and/or at least partially abut at least one of the excitation fins 106, 108, as described below.

Alternatively, the fin part 104 may be disposed on the circuit board 306. The RF chip 308 may be disposed adjacent thereto and the RF signal may be carried to the fin part 104, such as under the fin part 104, via a conduit on the circuit board 306.

The fin part 104 of FIG. 3 further includes a third excitation fin 302 or a further excitation structure 302. The height of the third excitation fin 302 may be tuned such that a third resonant wave may be excited with a slight time delay with respect to the first and second resonant waves. In particular, the third resonant wave may be excited between the first excitation fin 108 and the third excitation fin 302 (or between the top edges thereof), which has a different third resonant frequency from the first and second resonant frequencies. The different resonant frequencies may make the transition broadband. No single frequencies, or resonance frequencies, are radiated, but the entire frequency range with which the excitation fins are excited. By superimposing the three resonant waves, the radar signal 116 is formed, which then propagates towards the output or radiating end 112 of the waveguide 102 and can be radiated above the radiating end 112. In particular, the entire frequency range used to excite the structure and/or fin part may be radiated.

Figure 4A:
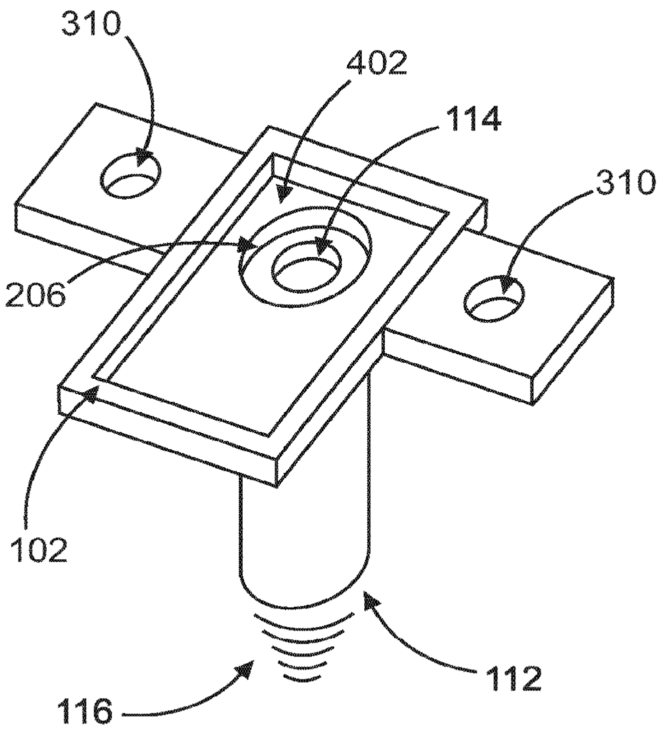
FIGS. 4*a* and 4*b* show a waveguide coupling device according to an embodiment.
Figure 4B:
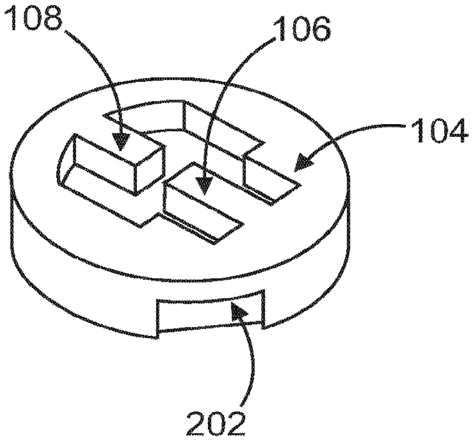

FIGS. 4*a* and 4*b* show a waveguide coupling device 100 according to an embodiment. In particular, FIG. 4*a* shows a perspective view of the waveguide 102 of the waveguide coupling device 100. FIG. 4*b* shows a perspective view of the fin part 104 of the waveguide coupling device 100. Unless otherwise described, the waveguide coupling device 100 of FIGS. 4*a* and 4*b* has the same elements and/or components as the waveguide coupling device of FIGS. 1 to 3. The waveguide 104 of FIG. 4*a* includes a recess 402 for receiving a radio frequency chip 308 (see also FIG. 5).

Figure 5:
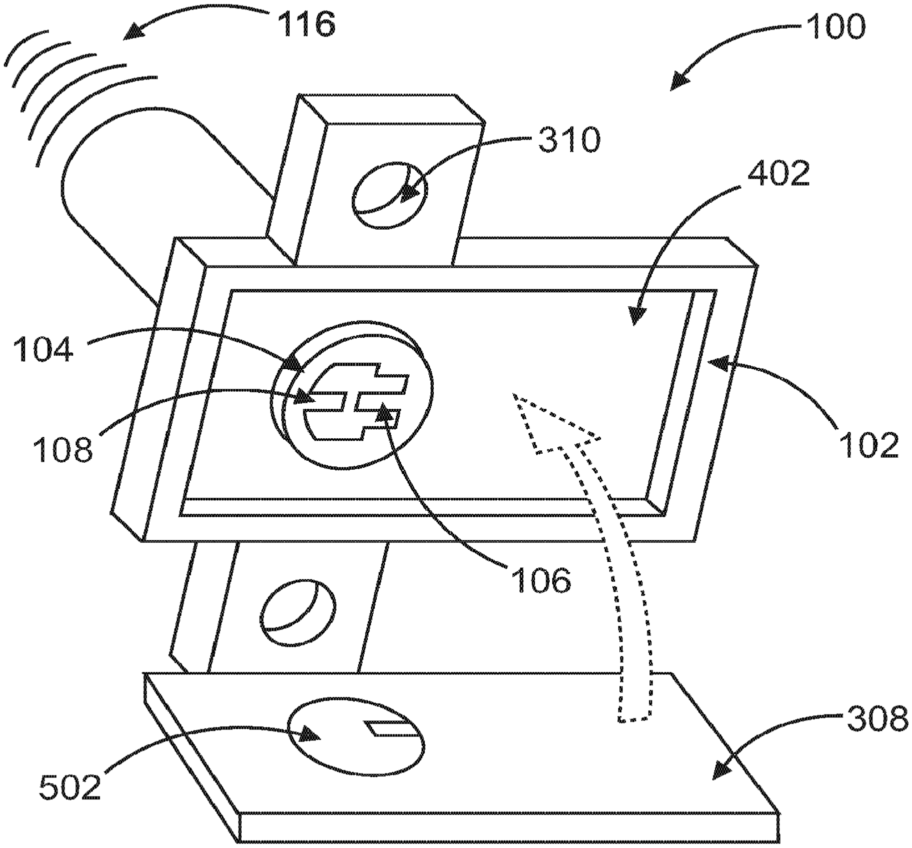
FIG. 5 shows a waveguide coupling device according to an embodiment.

FIG. 5 illustrates a waveguide coupling device 100 according to an embodiment. In particular, FIG. 5 shows a perspective view in which the radio frequency chip 308 is attached to the waveguide 104 with the fin part 102 having already been coupled to the waveguide 102. Unless otherwise described, the waveguide coupling device 100 of FIG. 5 has the same elements and/or components as the waveguide coupling devices 100 of FIGS. 1 through 4*b*. Alternatively, the RF chip may be disposed or seated on a small conductor plate 308.

In FIG. 5, the fin part 104 is arranged in a predetermined or predefined position relative to the waveguide 102 and coupled thereto. In particular, the fin part 104 may be arranged concentrically to the waveguide 102. This predetermined or predefined position may thereby be selected such that an excitation element 502 of the radio frequency chip 308 or the waveguide coupling device 100 is aligned parallel to a transverse extension direction of at least one of the excitation fins 106, 108. The transverse extension direction of one of the excitation fins 106, 108 may be transverse or orthogonal to the axial direction of the waveguide 102 and/or parallel to a radial direction of the waveguide 102. Such an alignment of the excitation fins 106, 108 with the excitation element 502 may be ensured by the non-rotationally symmetrical receptacle 206 of the waveguide 102.

Figure 6:
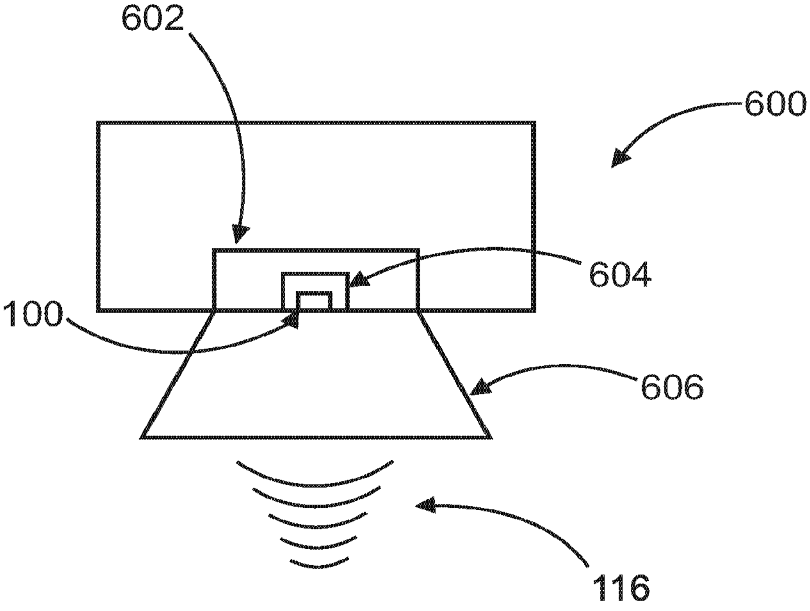
FIG. 6 shows a radar sensor according to an embodiment.

FIG. 6 shows a radar sensor 400 according to an embodiment. The radar sensor 600 of the embodiment of FIG. 6 comprises a radar module 602 and a waveguide coupling device 100. The radar module 602 further includes a waveguide coupling device 100, as described above, such that a radar signal 116 can be coupled into and radiated through an antenna 606, for example.

Supplementally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A waveguide coupling device for a radar sensor, comprising:

a waveguide configured to emit a radar signal via a radiating end of the waveguide; and a fin part, via which a radio frequency (RF) signal is configured to be coupled into the waveguide for generating the radar signal, wherein the waveguide and the fin part are formed in two parts, wherein the fin part is mechanically coupled to an excitation end of the waveguide opposite the radiating end of the waveguide, wherein the fin part has at least two excitation fins configured to be excited by the RF signal to form at least two resonant waves having mutually different resonant frequencies, and wherein the waveguide is further configured to generate the radar signal based on a superposition of the at least two resonant waves in an inner volume of the waveguide.

2. The waveguide coupling device according to claim 1, wherein the fin part and the waveguide are interlockingly coupled and/or frictionally coupled to each other.

3. The waveguide coupling device according to claim 1, wherein the fin part and the waveguide are coupled together in a non-rotational manner, and/or wherein the fin part and the waveguide are concentrically arranged with respect to each other.

4. The waveguide coupling device according to claim 1, wherein a receptacle is formed on the excitation end of the waveguide, and wherein the fin part includes a receiving portion at least partially received within a waveguide receiving portion such that the fin part and the waveguide are coupled together.

5. The waveguide coupling device according to claim 4, wherein the receptacle has a receptacle contour, and wherein the receiving portion of the fin part has an outer contour formed to correspond to the receptacle contour of the receptacle of the waveguide in such a way that the fin part is interlockingly coupled to the waveguide.

6. The waveguide coupling device according to claim 5, wherein the receptacle contour of the receiving portion of the waveguide and the outer contour of the receiving portion of the fin part have positioning structures configured to correspond to each other so that the at least two excitation fins are coupled to the waveguide in a predetermined position relative to the waveguide.

7. The waveguide coupling device according to claim 4, wherein at least one pressing rib is formed on the receptacle of the waveguide and/or on the receiving portion of the fin part for pressing the fin part to the waveguide and/or for relative positioning of the fin part and the waveguide.

8. The waveguide coupling device according to claim 7, wherein the receptacle of the waveguide and the receiving portion of the fin part are pressed together at least punctually, area-wise, or completely along an outer circumference of the receiving portion.

9. The waveguide coupling device according to claim 4, wherein the receiving portion of the fin part is arranged in the receiving portion of the waveguide in such a way that a separation plane and/or interface between the fin part and the waveguide is offset and/or spaced apart from the at least two excitation fins in an axial direction of the waveguide.

10. The waveguide coupling device according to claim 4, wherein a separation plane and/or interface between the fin part and the waveguide is disposed closer to the radiating end of the waveguide in an axial direction of the waveguide than the at least two excitation fins.

11. The waveguide coupling device according to claim 1, wherein the at least two excitation fins is at least partially disposed within an interior volume of the waveguide, and/or wherein the at least two excitation fins are further configured to be excited by the RF signal such that one or more resonant waves are generated in an interior volume of the waveguide and/or the fin part to form the radar signal.

12. The waveguide coupling device according to claim 1, further comprising at least one printed circuit board on which the fin part and/or the waveguide are arranged and/or fixed.

13. The waveguide coupling device according to claim 12, wherein the fin part and/or the waveguide is fixed to the printed circuit board by means of an axially acting screw connection, by means of gluing, by means of soldering, by means of welding, and/or by means of pressing.

14. The waveguide coupling device according to claim 12, wherein a radio frequency chip and/or a radio frequency circuit is disposed between the printed circuit board and the fin part for generating the RF signal.

15. The waveguide coupling device according to claim 12, wherein at least one excitation element for coupling and/or transmitting the RF signal to the at least two excitation fins of the fin part is arranged between the printed circuit board and the fin part.

16. The waveguide coupling device according to claim 1, wherein the fin part and/or the waveguide includes surface protection configured to protect a surface of the waveguide coupling device from environmental influences.

17. The waveguide coupling device according to claim 1, wherein the radar signal has an average frequency greater than 50 GHz up to 300 GHz.

18. A radar sensor, comprising:

a waveguide coupling device according to claim 1, wherein the radar sensor is configured and designed as a radar level measuring device configured to determine a level of a medium.

19. The waveguide coupling device according to claim 1, wherein the waveguide coupling device is configured for a radar sensor and/or a level meter.

* * * * *